United States Patent
Elliott

(10) Patent No.: US 8,025,130 B2
(45) Date of Patent: *Sep. 27, 2011

(54) ROLLER DISK BRAKE FOR A WINCH

(75) Inventor: Ronald L. Elliott, Oregon City, OR (US)

(73) Assignee: Warn Industries, Inc., Clackamas, OR (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/683,473

(22) Filed: Mar. 8, 2007

(65) Prior Publication Data

US 2007/0227835 A1    Oct. 4, 2007

Related U.S. Application Data

(63) Continuation-in-part of application No. 10/829,756, filed on Apr. 22, 2004, now Pat. No. 7,222,700.

(51) Int. Cl.
    *B60T 1/00*    (2006.01)
(52) U.S. Cl. .................. 188/30; 188/166; 254/375
(58) Field of Classification Search .............. 188/30, 188/166, 82.1, 82.3; 248/378, 375; 254/378, 375, 254/375

See application file for complete search history.

(56) References Cited

U.S. PATENT DOCUMENTS

| | | | |
|---|---|---|---|
| 292,828 A | 2/1884 | Lawlor | |
| 320,222 A | 6/1885 | Clinton | |
| 710,757 A | 10/1902 | Coleman et al. | |
| 1,285,663 A | 11/1918 | Fouse | |
| 1,911,461 A | 5/1933 | Musselman | |
| 2,175,383 A | 10/1939 | Eason | |
| 2,423,070 A | 6/1947 | Sayles | |
| 2,783,861 A | 3/1957 | Jungles | |
| 2,827,136 A | 3/1958 | Sorchy | |
| 2,834,443 A | 5/1958 | Olchawa | |
| 2,891,767 A | 6/1959 | Armington, Jr. | |
| 2,925,157 A | 2/1960 | Davis | |
| 3,071,349 A | 1/1963 | Glaze | |
| 3,107,899 A | 10/1963 | Henneman | |
| 3,319,492 A | 5/1967 | Magnuson | |
| 3,382,953 A | 5/1968 | Wilkinson | |
| 3,519,247 A | 7/1970 | Christison | |
| 3,536,169 A | 10/1970 | Arnold | |
| 3,627,087 A | 12/1971 | Eskridge | |
| 3,834,670 A | 9/1974 | Pityo | |

(Continued)

OTHER PUBLICATIONS

Robert L. Norton Machine Design: An integrated approach, Prentice-Hall 1996 (p. 678-680).

*Primary Examiner* — Bradley King
(74) *Attorney, Agent, or Firm* — Harness, Dickey & Pierce, P.L.C.

(57) ABSTRACT

A power device includes a motor, a drive shaft, and a roller brake system including a cam mechanism. The motor may put out a driving torque in a first and a second rotary direction. The cam mechanism includes first and second cam members. The first cam member may be in a driven engagement with the motor and the second cam member may be slidably engaged with the first cam member and coupled to the drive shaft. The first cam member includes a circumferentially disposed ramped surface having a stop member at a first end thereof. The said second cam member is axially and rotatably fixed with the drive shaft and includes an axially extending protrusion disposed about a circumference thereof and slidably engaged with the ramped surface.

15 Claims, 7 Drawing Sheets

U.S. PATENT DOCUMENTS

| | | |
|---|---|---|
| 3,994,376 A | 11/1976 | Fulghum |
| 4,004,780 A | 1/1977 | Kuzarov |
| 4,103,872 A | 8/1978 | Hirasuka |
| 4,103,873 A | 8/1978 | Sato et al. |
| 4,118,013 A | 10/1978 | Christison et al. |
| 4,185,520 A | 1/1980 | Henneman et al. |
| 4,227,680 A | 10/1980 | Hrescak |
| 4,344,587 A | 8/1982 | Hildreth |
| 4,408,746 A | 10/1983 | Marsch et al. |
| 4,461,460 A | 7/1984 | Telford |
| 4,545,567 A | 10/1985 | Telford et al. |
| 4,565,352 A | 1/1986 | Hasselman et al. |
| 4,601,370 A | 7/1986 | Papadopoulos |
| 4,898,265 A | 2/1990 | Metcalf |
| 5,002,259 A | 3/1991 | Manning et al. |
| 5,261,646 A | 11/1993 | Telford |
| 5,398,923 A | 3/1995 | Perry et al. |
| 5,482,255 A | 1/1996 | Daschel et al. |
| RE36,216 E | 6/1999 | Telford |
| 6,604,731 B2 | 8/2003 | Hodge |
| 7,222,700 B2 * | 5/2007 | Elliott .......................... 188/30 |
| 2005/0236238 A1 | 10/2005 | Elliott |

* cited by examiner

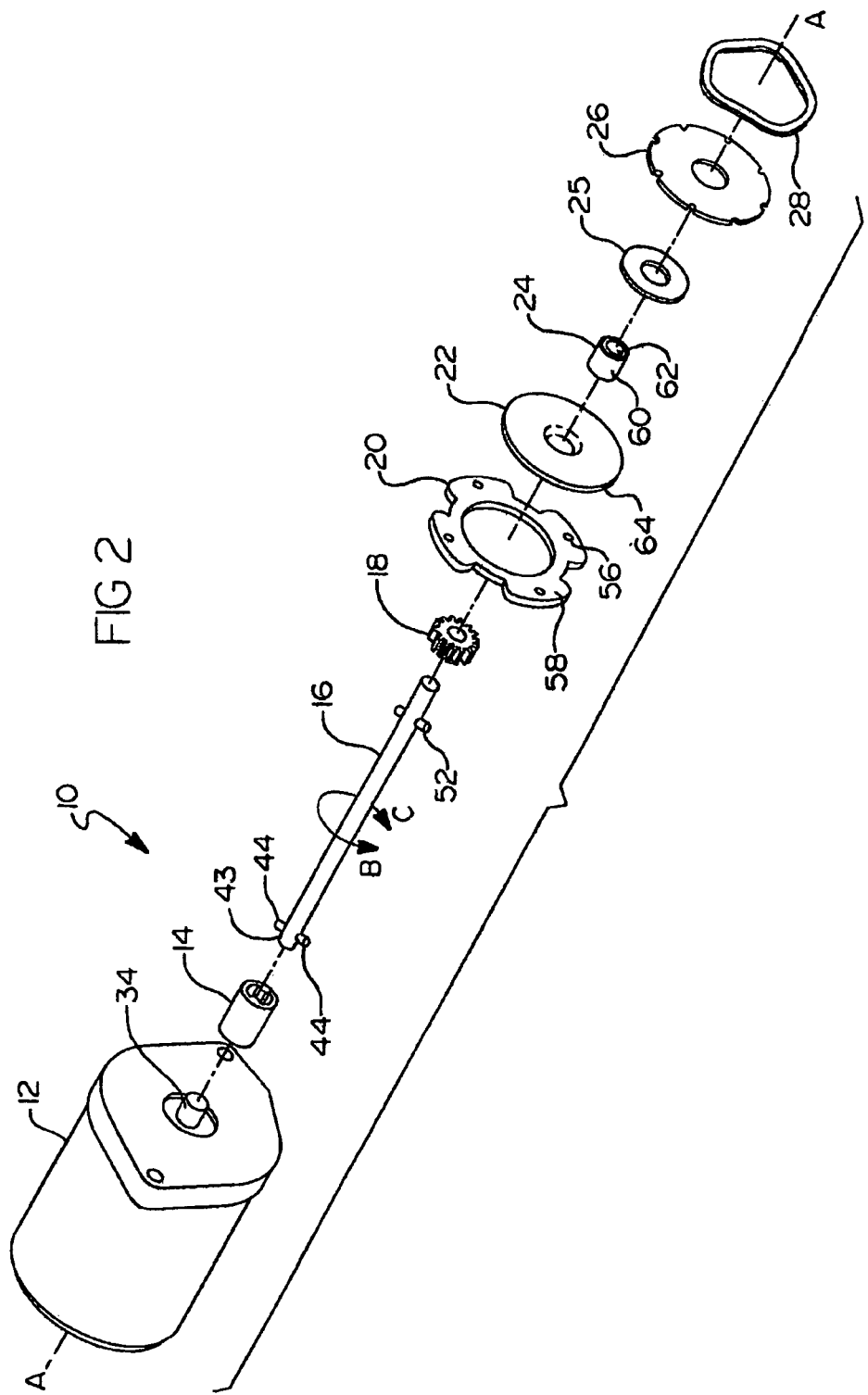

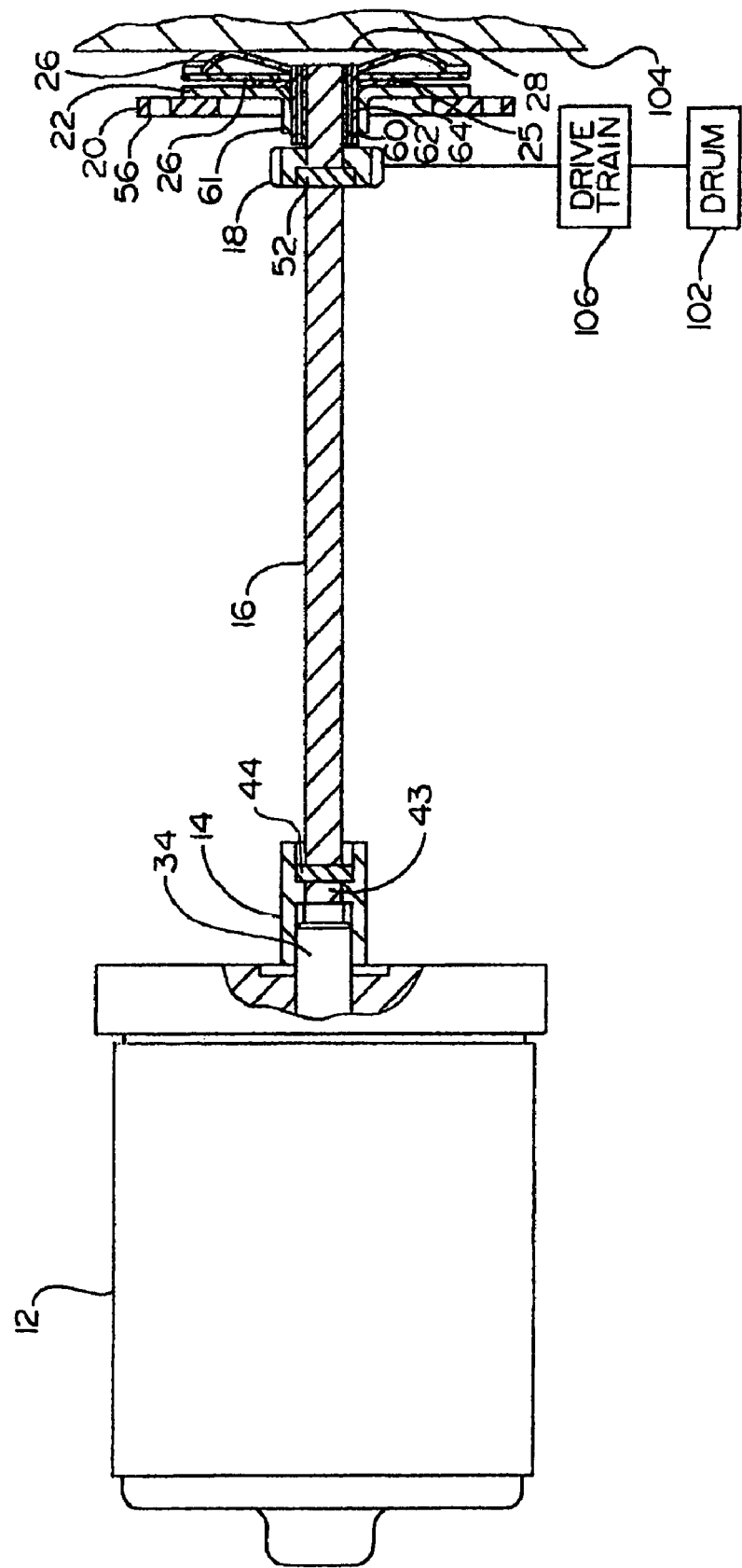

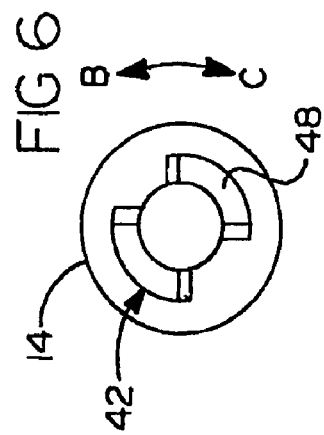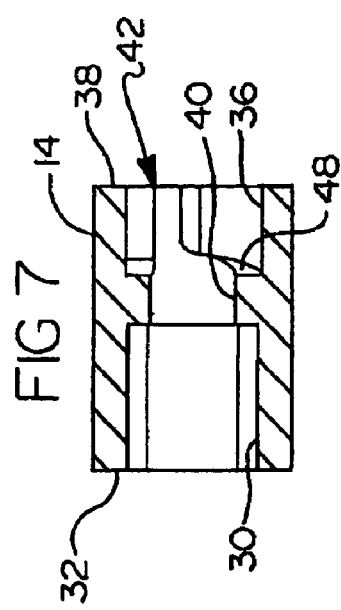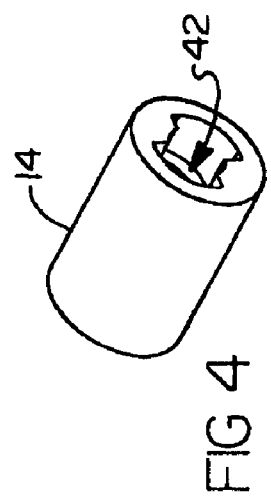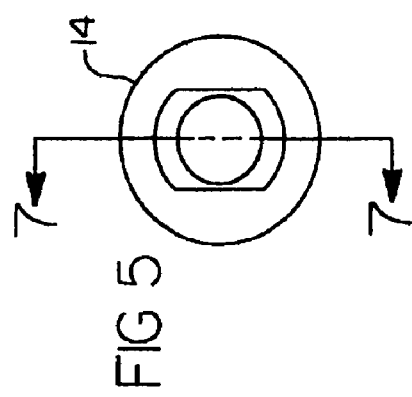

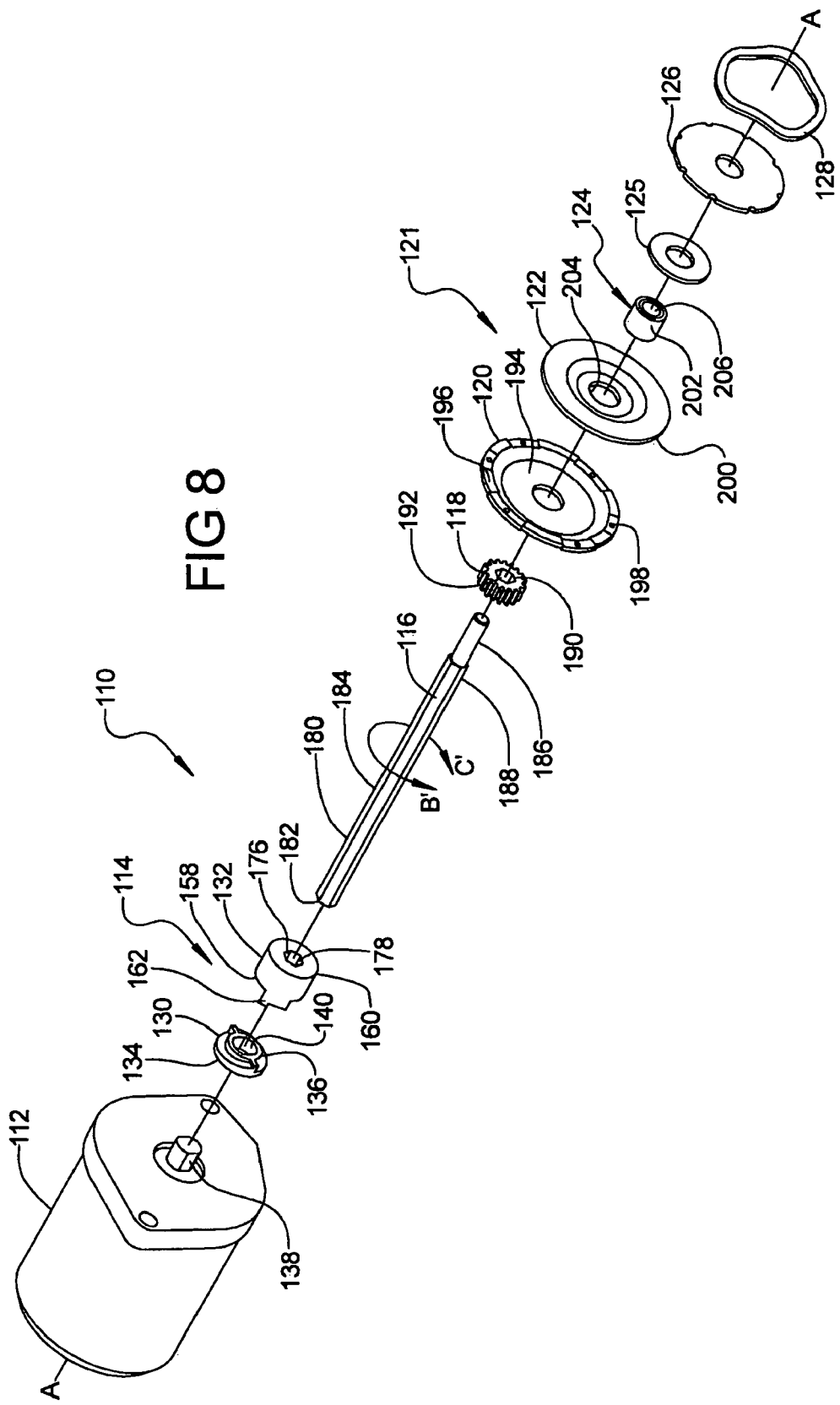

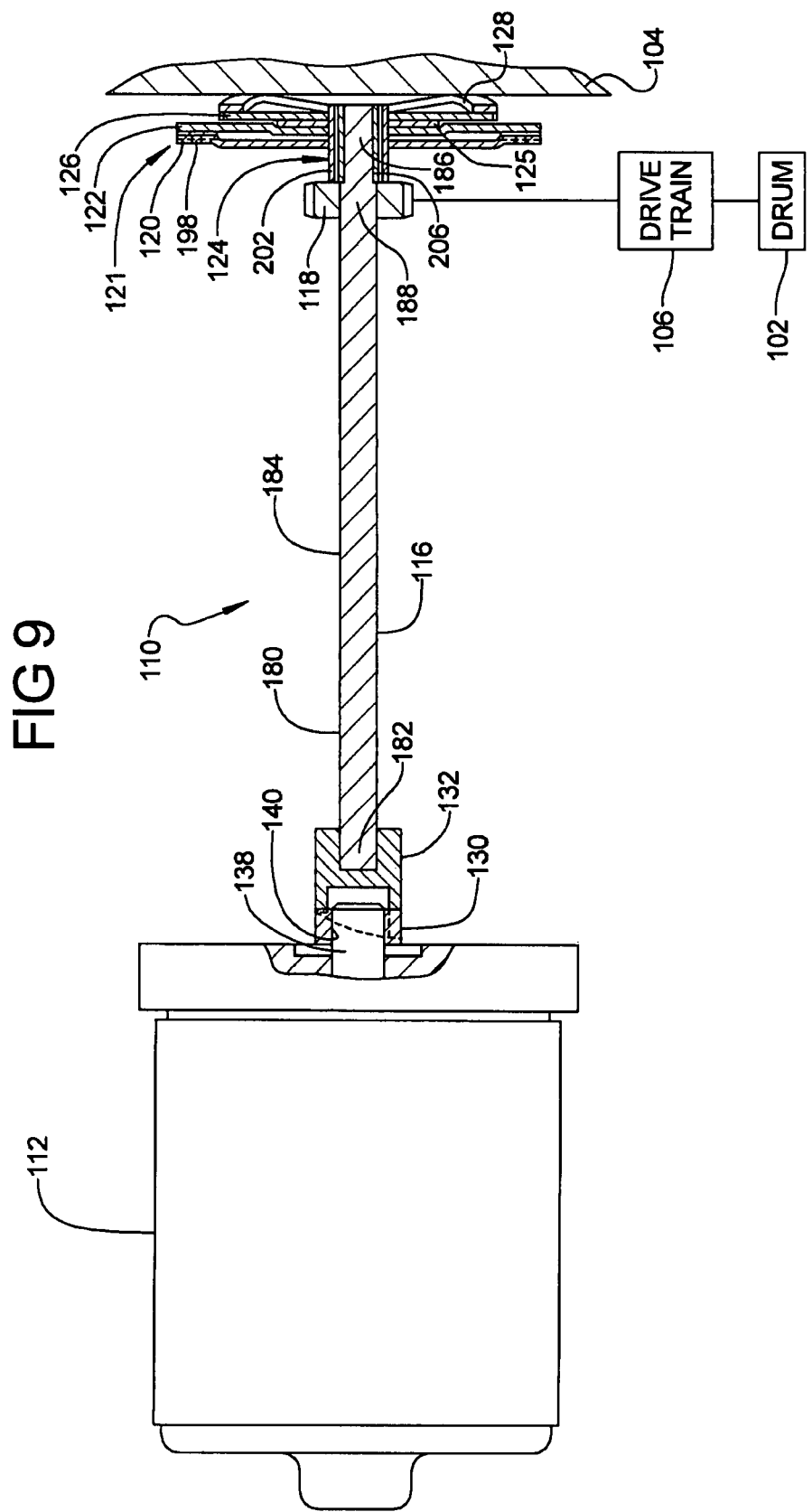

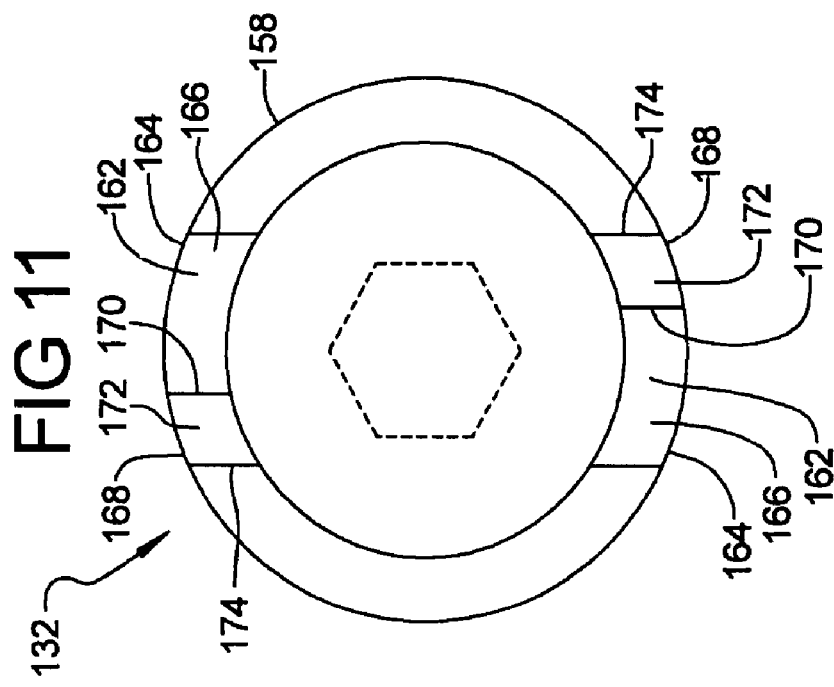
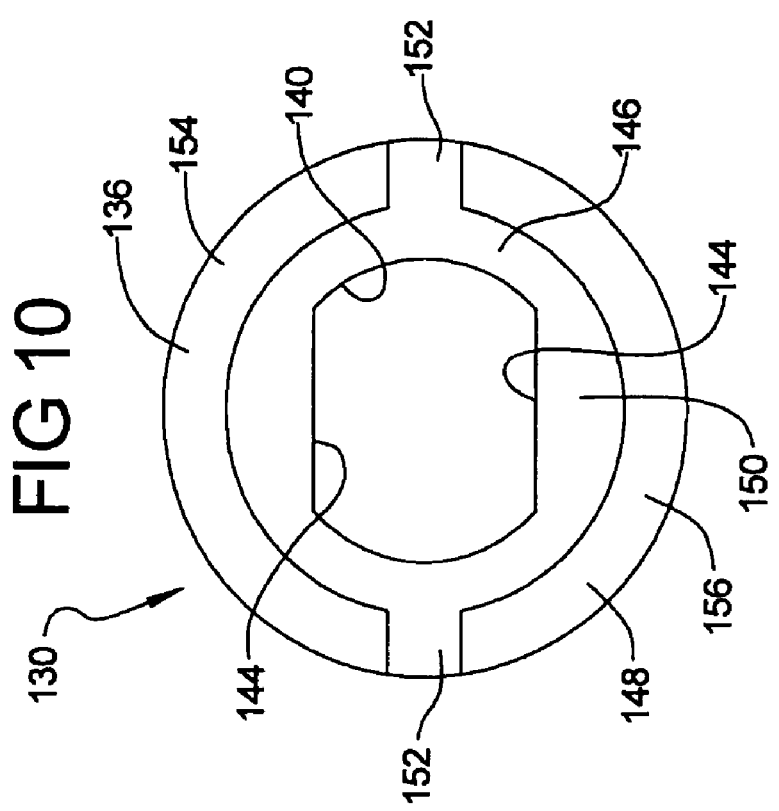

ROLLER DISK BRAKE FOR A WINCH

CROSS-REFERENCE TO RELATED APPLICATIONS

This application is a continuation-in-part of U.S. patent application Ser. No. 10/829,756 filed on Apr. 22, 2004, now U.S. Pat. No. 7,222,700, issued May 29, 2007. The disclosure of the above application is incorporated herein by reference.

FIELD OF THE INVENTION

The present invention relates to brake mechanisms and, more particularly, relates to a brake mechanism for use with a winch, hoist, or other device requiring resistance to driven torque.

BACKGROUND OF THE INVENTION

As is common practice, winches, hoists, and other power devices requiring resistance to driven torque often employ brake mechanisms to satisfy various design criteria. Winches, hoists, and the like typically employ a motor that drives a gear train, which is coupled to a drum. The motor is often capable of being driven in opposite rotary directions, which is commonly referred to as "power-in" and "power-out" directions. When the motor is not actuated (i.e. idle), it is typically preferable that the drum is stationary thereby opposing any external loads or driven torque.

The brake mechanisms of these devices often utilize a series of brake or friction plates that provide an opposing force when engaged that minimizes or prevents movement of the drum in response to any external driven torque. In essence, these brake mechanisms lock the power device to permit "holding" while under load.

However, traditional brake mechanisms suffer from a number of disadvantages. For example, traditional brake mechanisms are incapable of eliminating drag associated with the brake mechanism when the device is being driven in the power-in direction. Similarly, traditional brake mechanisms often suffer from excessive drag that inhibits efficient operation when the device is being driven in the power-out direction. Still further, traditional brake mechanisms are often incapable of distinguishing between drive torque and driven torque and, thus, may lead to excessive drag on the device or insufficient holding capacity.

Accordingly, there exists a need in the relevant art to provide a brake mechanism for use with a winch, hoist, or similar power device that is capable of eliminating drag associated with a power-in drive motion. Similarly, there exists a need in the relevant art to provide a brake mechanism for use with a winch, hoist, or similar power device that is capable of minimizing drag associated with a power-out drive motion. Still further, there exists a need in the relevant art to provide a brake mechanism for use with a winch, hoist, or similar power device that is capable of overcoming the limitations of the prior art.

SUMMARY OF THE INVENTION

According to the principles of the present invention, a brake mechanism is provided having an advantageous construction. The brake mechanism includes a motor output shaft outputting a driving torque in a first and a second rotary direction. A camming device operably couples the output shaft to a drive shaft for fixed rotation. A roller clutch operably couples the drive shaft and a brake device. The brake device is normally in an engaged position that prevents rotation of the brake device. The roller clutch permits the drive shaft to spin freely relative to the brake device when the output shaft of the motor is driven in the first rotary direction, yet locks the drive shaft and brake device together when the output shaft of the motor is driven in the second rotary direction. Therefore, when the motor output shaft is driven in the first rotary direction, the brake device remains biased into the engaged position, yet the roller clutch permits free rotation of the drive shaft relative to the brake device. When the motor output shaft is driven in the second rotary direction, the roller clutch locks the drive shaft and the brake device together, yet the camming device shifts the drive shaft which disengages the brake device and permits free rotation of the drive shaft and brake device together. When the motor output shaft is idle, the camming device and roller clutch prevent uncommanded movement of the drive shaft.

Alternatively, a power device may include a motor, a drive shaft, and a cam mechanism. The motor may put out a driving torque in a first and a second rotary direction. The cam mechanism may include first and second cam members. The first cam member may be in a driven engagement with the motor and the second cam member may be slidably engaged with the first cam member and coupled to the drive shaft. The first cam member may include a circumferentially disposed ramped surface having a stop member at a first end thereof. The said second cam member may be axially and rotatably fixed with said drive shaft and may include an axially extending protrusion disposed about a circumference thereof and slidably engaged with the ramped surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an exploded perspective view illustrating the roller disk brake system according to the principles of the present invention;

FIG. 3 is a cross-sectional view illustrating the roller disk brake system;

FIG. 4 is a perspective view illustrating a cam coupler of the present invention;

FIG. 5 is a left side view illustrating the cam coupler;

FIG. 6 is a right side view of the cam coupler;

FIG. 7 is a cross-sectional view illustrating the cam coupler taken along Line 7-7 of FIG. 5;

FIG. 8 is an exploded perspective view illustrating an alternate roller disk brake system according to the principles of the present disclosure;

FIG. 9 is a cross-sectional view illustrating the roller disk brake system of FIG. 8;

FIG. 10 is a top plan view of a first cam member shown in FIG. 8; and

FIG. 11 is a bottom plan view of a second cam member shown in FIG. 8.

DETAILED DESCRIPTION OF THE PREFERRED EMBODIMENT

Figure 1:
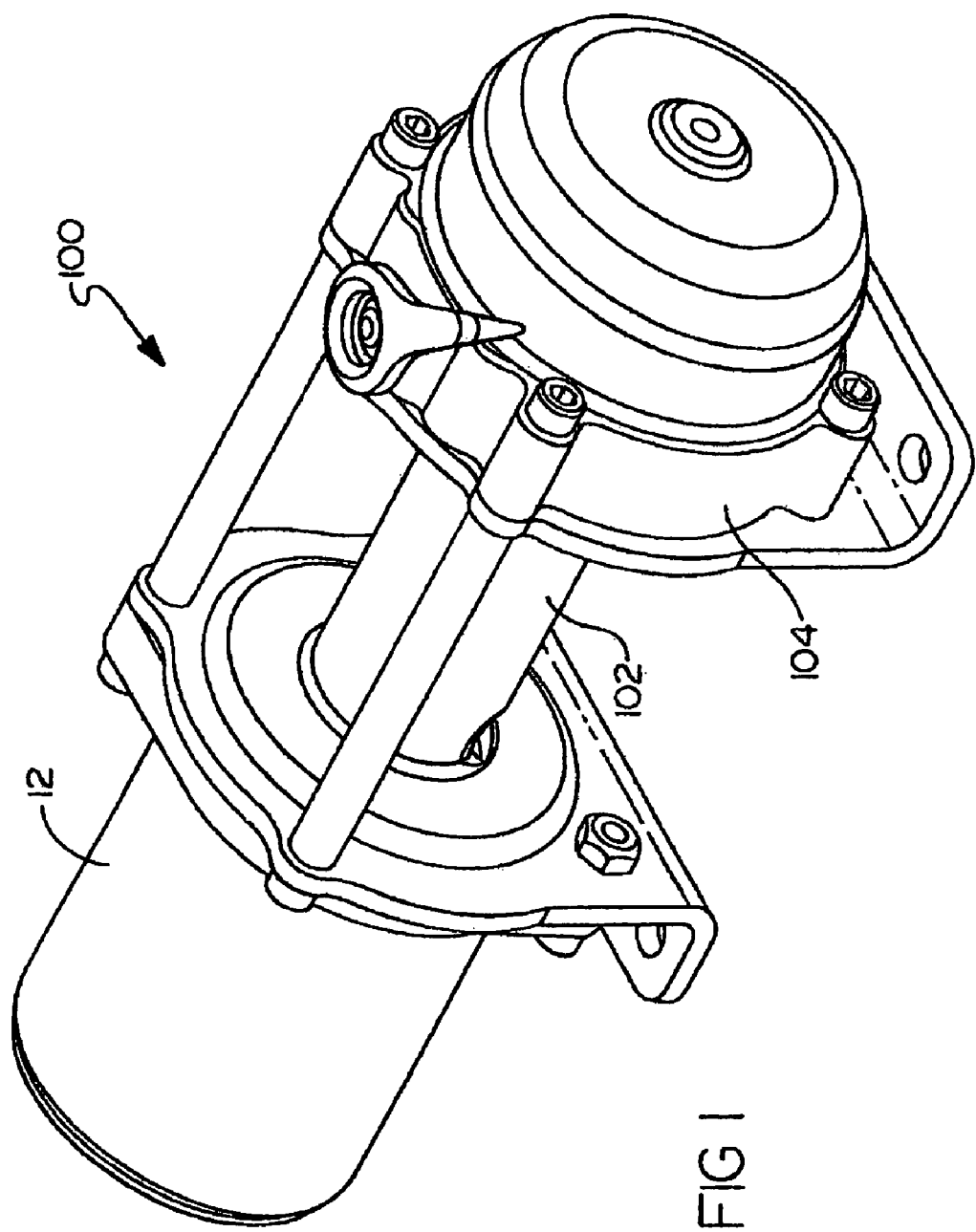
FIG. 1 is a perspective view illustrating an exemplary winch employing a roller disk brake system according to the principles of the present invention.

The following description of the preferred embodiment is merely exemplary in nature and is in no way intended to limit the invention, its application, or uses. For example, the present invention may find utility in a wide variety of applications, such as winches, hoists, or similar device.

Referring now to the figures, there is illustrated a roller disk brake system, generally indicated at 10, for use with a winch, hoist, or other power device requiring resistance to driven torque. In the interest of brevity, the present disclosure will not discuss in detail the overall construction of the associated winch, hoist, or other power device.

However, briefly by way of background, an exemplary winch 100 for use with the present invention is illustrated in FIG. 1. Winch 100 preferably includes a rotatable hollow cylindrical drum 102 for winding and unwinding a length of wire rope or cable (not shown). Drum 102 may be positively driven in either direction by a reversing motor 12 (FIG. 2). In other words, drum 102 may be positively driven in a "power-in" direction, thereby retracting the wire rope or cable, and a "power-out" direction, thereby extending the wire rope or cable.

Motor 12 is generally a reversible electric motor, thereby receiving its power-input from a battery. However, it should be understood that other types of motors, such as hydraulic, may be used in connection with the present invention to provide the necessary motive force. Motor 12 is coupled to a drum 102 through a speed reducing gear train 106 (FIGS. 2 and 3) contained within a housing 104 (FIG. 1). Gear train 106 reduces the rotational speed of drum 102 with respect to the motor output shaft (and thus provides torque amplification) in a manner such as disclosed in commonly assigned U.S. Pat. No. 4,545,567. Roller disk brake system 10 is preferably provided in the interior cavity of drum 102 and housing 104, so as to protect roller disk brake system 10 from damage and/or environmental exposure.

Referring to FIGS. 2-7, roller disk brake system 10 includes a cam coupler 14, a drive shaft 16, a sun gear 18, a stationary plate 20, a brake disk 22, a roller clutch 24, a shim washer 25, a thrust washer 26, and a spring 28.

As best seen in FIGS. 4-7, cam coupler 14 is preferably cylindrical in shape. Cam coupler 14 includes a first bore 30 formed in a first end 32 thereof. First bore 30 is sized and shaped to operably receive an output shaft 34 extending from motor 12 (FIG. 2). Accordingly, cam coupler 14 is operably coupled to motor output shaft 34 and driven in response to motor 12.

Still referring to FIGS. 4-7, cam coupler 14 includes a second bore 36 formed in a second end 38 thereof. More particularly, second bore 36 includes a central portion 40 and a cam 42. Central portion 40 extends through cam coupler 14 and is sized to receive an end 43 of drive shaft 16 therein (see FIG. 3). As can be seen in FIGS. 2 and 3, drive shaft 16 includes at least one cam follower 44, disposed orthogonal to a longitudinal axis A-A of drive shaft 16. Cam follower 44 is operable to cammingly engage cam 42 to cause axial movement of drive shaft 16 along axis A-A. To this end, cam 42 of cam coupler 14 includes an inclined portion 48 extending from an interior level toward second end 38. The operation of cam coupler 14 will be discussed in detail below.

Referring again to FIGS. 2 and 3, drive shaft 16 includes a drive pin 52 for engaging sun gear 18. Drive pin 52 cooperates with a slot 54 formed in sun gear 18, thereby coupling sun gear 18 with drive shaft 16 for rotation therewith. However, it should be appreciated that sun gear 18 may be fixed for rotation with drive shaft 16 through any one of a number of conventional connections, such as a key and slot connection, spline connection, etc. Sun gear 18 enmeshingly engages additional gears (not shown) of gear train 106 extending between drive shaft 16 and drum 102, as is known in the art. It should be understood that gear train 106 may have any one of a number of different configurations to achieve a desired gear ratio and, thus, is merely schematically illustrated in FIG. 3.

Still referring to FIGS. 2 and 3, stationary plate 20 is generally planar in construction and includes a plurality of mounting apertures 56 and a friction surface 58. The plurality of mounting apertures 56 are sized to receive a fastener therein to fixedly couple stationary plate 20 to housing 104 to prevent rotation of stationary plate 20. Although the preferred method discloses fasteners for preventing rotation of the stationary plate 20, other methods of preventing the rotation of the plate 20 can be utilized.

Brake disk 22 includes a friction surface 64 disposed adjacent friction surface 58 of stationary plate 20. Friction surface 64 of brake disk 22 is operably engageable with friction surface 58 of stationary plate 20 to prevent selectively relative rotation between stationary plate 20 and brake disk 22, thus providing a braking function. Brake disk 22 is biased in an engaged position with stationary plate 20 via spring 28. Specifically, spring 28 acts upon housing 104, thereby outputting a biasing force against thrust washer 26, shim washer 25, and brake disk 22 and engaging brake disk 22 with stationary plate 20. Generally, stationary plate 20 and brake disk 22 serve to define a clutching device 21. The shim washer 25 serves as a bearing device reducing the friction on the back side of the brake disk 22. A roller bearing, thrust bearing, or other low friction device can be used in place of the shim washer 25, as space permits.

Roller clutch 24 is disposed between brake disk 22 and an end of drive shaft 16. Roller clutch 24 is operable to permit free relative rotation between brake disk 22 and drive shaft 16 when motor 12 is operated in a power-in direction. Conversely, roller clutch 24 is operable to lock, thereby preventing relative rotation between brake disk 22 and drive shaft, when motor 12 is operated in a power-out direction. Cam coupler 14 moves brake disk 22 away from stationary plate 20 allowing system rotation. However, roller clutch 24 remains locked in response to a driven torque from an external load.

Specifically, one-way roller clutch 24 includes an outer sleeve 60 fixedly coupled to a hub 61 of brake disk 22 to prevent relative rotation and axial movement of brake disk 22 relative to outer sleeve 60. Roller clutch 24 further includes an inner sleeve 62 similarly fixedly coupled to drive shaft 16 to prevent relative rotation and axial movement of drive shaft 16 relative to inner sleeve 62. A plurality of rollers are disposed between the inner and outer sleeves 62, 60 to prevent relative rotation therebetween in one direction and to relative rotation therebetween in a second direction. Although a roller clutch is shown, other clutch mechanisms can be used.

Operation

The present invention operates primarily in three scenarios—a first scenario occurs when a drive torque is required to retract the wire rope (i.e. power-in mode), a second scenario is when a drive torque in the opposite direction is used to extend the wire rope (i.e. power-out mode), and a third scenario occurs when a driven torque is prevented from extending the wire rope (i.e. holding mode).

In the first scenario where a drive torque is required to retract the wire rope, motor 12 is actuated to drive output shaft 34 in direction B (FIG. 2). Output shaft 34 is coupled with cam coupler 14 thereby driving cam coupler 14 in direction B. As a result of the shape of cam 42 and the direction of rotation of cam coupler 14, cam follower 44 remains at a lowermost position along cam 42 within bore 36. Consequently, drive shaft 16 remains biased to a leftmost position (as illustrated in FIG. 3) in response to the biasing force of spring 28 acting against brake disk 22 and the axially-fixed connection between brake disk 22, roller clutch 24, and drive shaft 16. As should be appreciated, when drive shaft 16 is biased to the leftmost position (as illustrated in FIG. 3), friction surface 64 of brake disk 22 engages friction surface 58 of stationary plate 20, thereby resisting relative rotation of brake disk 22 and stationary plate 20. However, when motor 12 drives drive shaft 16 in direction B, roller clutch 24 is in a free spinning mode such that inner sleeve 62 rotates freely relative to outer sleeve 60 and thus isolates drive shaft 16 from the engaged condition of brake disk 22 and stationary plate 20. Therefore, motor 12 drives drive shaft 16 and sun gear 18 without having to overcome the friction of brake disk 22 and stationary plate 20.

In the second scenario where a drive torque in an opposite direction is used to extend the wire rope, motor 12 is actuated to drive output shaft 34 in direction C (FIG. 2). Output shaft 34 is coupled with cam coupler 14 thereby driving cam coupler 14 in direction C. As a result of the shape of cam 42 and the opposite direction of rotation of cam coupler 14, cam follower 44 travels up cam 42 to an uppermost position along inclined portion 48 of cam 42 within bore 36. Consequently, drive shaft 16 is forced to a rightmost position (as illustrated in FIG. 3) against the biasing force of spring 28. As should be appreciated, when drive shaft 16 is forced to the rightmost position, roller clutch 24 carries brake disk 22 rightward against the biasing force of spring 28, thus disengaging friction surface 64 of clutch plate 24 from friction surface 58 of stationary plate 20. When motor 12 drives drive shaft 16 in direction C, roller clutch 24 is in a locked mode and rotates brake disk 22 as drive shaft 16 rotates. However, clutch plate 22 is disengaged from stationary plate 20 and thus rotates freely without applying any braking force.

In the third scenario where a driven torque is prevented from extending the wire rope, motor 12 is idle and thus does not output a driving force to output shaft 34. This driven torque, which is applied in direction C, may come in the form of an external force exerted upon the wire rope during a "holding" maneuver. As a result of the biasing force of spring 28, forcing brake disk 22 against stationary plate 20, drive shaft 16 is forced to the leftmost position causing cam follower 44 to travel down cam 42 to the lowermost position within bore 36 (see FIG. 3). This occurs any time drive torque is removed.

As described above, when drive shaft 16 is forced to the leftmost position, friction surface 64 of brake disk 22 engages friction surface 58 of stationary plate 20, thereby preventing relative rotation of brake disk 22 and stationary plate 20. Further, motor 12 is idle and thus the driven torque is attempting to drive drum 102 and consequently drive shaft 16 in direction C. In direction C, roller clutch 24 is in the locked mode and cam follower 44 of drive shaft 16 is in the lowermost (left) position, thereby coupling drum 102, gear train 106, sun gear 18, drive shaft 16, brake disk 22, stationary plate 20. Therefore, the driven torque must overcome the static friction force between brake disk 22 and stationary plate 20 to effect any rotational movement of drum 106. This static friction force is designed to withstand a predetermined maximum load.

Accordingly, the present invention provides a number of advantages over the prior art. Specifically, the present invention provides no drag when the motor produces a drive torque in the power-in direction (direction B). Similarly, the present invention provides very little drag when the motor produces a drive torque in an opposition power-out direction (direction C). Still further, the present invention provides an enormous and reliable frictional resistance to driven torque. This frictional resistance is easily configurable depending upon the characteristics of frictional surfaces 58 and 64 and the spring force of spring 28. The performance of the present invention is further consistent and does not inhibit the operation of the associated device, such as the winch, hoist, or the like. Lastly, the present invention provides a simple and cost effective method of overcoming the disadvantages of the prior art.

As seen in FIGS. 8 and 9, an alternate roller disk brake system 110 may form part of a power device, such as winch 100, in place of roller disk brake system 10. The description of winch 100 above applies equally to the winch utilized with roller disk brake system 110. Roller brake system 110 may include a cam mechanism 114, a drive shaft 116, a sun gear 118, a stationary plate 120, a brake disk 122, a roller clutch 124, a shim washer 125, a thrust washer 126, and a biasing member 128.

Cam mechanism 114 may include first and second cam members 130, 132. First cam member 130 may include first and second ends 134, 136. First cam member 130 may be coupled to an output shaft 138 of a motor 112 extending through first end 134. Motor 112 may be generally similar to motor 12 providing a driving torque in first and second rotary directions. Motor 112 may be employed in winch 100 in a manner generally similar to motor 12. The description of the operation of motor 12, therefore, applies equally to motor 112. More specifically, first cam member 130 may include a bore 140 therethrough for engagement with output shaft 138. Bore 140 may include a size and shape similar to the size and shape of output shaft 138. More specifically, output shaft 138 may include flats 142 thereon and bore 140 may include corresponding flats 144 for engagement therewith. First cam member 130 may therefore be operably coupled to output shaft 138 and driven by motor 112.

With additional reference to FIG. 10, second end 136 of first cam member 130 may include a pilot portion 146 and a ramped surface 148 as shown in FIG. 8. Pilot portion 146 may extend axially beyond ramped surface 148 and may include a centrally disposed body portion 150 and radially extending stop members 152. Ramped surface 148 may circumferentially surround body portion 150 and may include first and second ramp portions 154, 156. Ends of first and second ramp portions 154, 156 may be defined by stop members 152. First and second ramp portions 154, 156 may progressively increase/decrease in axial height along the circumferential extent between stop members 152.

Second cam member 132 may include first and second ends 158, 160. With additional reference to FIG. 11, first end 158 of second cam member 132 may include circumferentially disposed protrusions 162 extending therefrom. Protrusions 162 may include an axially extending body 164 including first and second portions 166, 168. First portion 166 may have an axial extent less than second portion 168, forming a notch 170 therebetween. An axially outermost surface 172 of second portion 168 may be ramped at an angle similar to the angle of first and second ramp portions 154, 156. A circumferential end 174 of second portion 168 may provide engagement between first and second cam members 130, 132 when first cam member 130 is driven in a first direction (discussed below).

Second end 160 of second cam member 132 may be coupled to drive shaft 116 for co-rotation therewith. Second end 160 may include a recess 176 having at least one flat 178 thereon. Specifically, recess 176 may have a generally hexagonal shaped profile. Drive shaft 116 may include at least one flat 180 on a first end 182. More specifically, first end 182 may have a generally hexagonal shaped cross-section for rotational engagement with second cam member 132.

Drive shaft 116 may include a hexagonal portion 184 along a majority of its axial extent, with a generally cylindrical portion 186 at a second end 188 thereof. Sun gear 118 may be disposed on hexagonal portion 184 of drive shaft 116 near second end 188. Sun gear 118 may include an aperture 190 having at least one flat 192 thereon for engagement with flat 180 on drive shaft 116. More specifically, aperture 190 may have a hexagonal profile generally similar to that of hexagonal portion 184 providing co-rotation between drive shaft 116 and sun gear 118.

Stationary plate 120 may include a generally planar body 194 having a plurality of friction surfaces 196, such as brake pads, and mounting apertures 198 circumferentially spaced thereabout. The plurality of mounting apertures 198 may be sized to receive a fastener therein to fixedly couple stationary plate 120 to housing 104 to prevent rotation of stationary plate 120.

Brake disk 122 may include a friction surface 200 disposed adjacent friction surfaces 196. Engagement between friction surfaces 196, 200 may prevent relative rotation between brake disk 122 and stationary plate 120, discussed below. Brake disk 122 may be biased into engagement with stationary plate 120 through a force applied by biasing member 128. Biasing member 128 may be in the form of a spring, such as the wave spring seen in FIGS. 8 and 9. Biasing member 128 may act against housing 104, thereby outputting a biasing force against thrust washer 126, shim washer 125, and brake disk 122, biasing brake disk 122 into engagement with stationary plate 120. Stationary plate 120 and brake disk 122 may therefore define a clutching device 121. Shim washer 125 may form a bearing device, reducing friction on the back side of brake disk 122. A roller bearing, thrust bearing, or any other low friction device may be used in place of shim washer 125.

Roller clutch 124 may be disposed between brake disk 122 and second end 188 of drive shaft 116. Roller clutch 124 may permit free relative rotation between brake disk 122 and drive shaft 116 when motor 112 is operated in a power-in direction. Conversely, roller clutch 124 may lock when motor 112 is operated in a power-out direction, thereby preventing relative rotation between brake disk 122 and drive shaft 116. As discussed below, cam mechanism 114 may move brake disk 122 out of engagement with stationary plate 120. However, roller clutch 124 may remain locked in position in response to a driven torque from an external load.

Specifically, roller clutch 124 may include an outer sleeve 202 fixedly coupled to hub 204 of brake disk 122 to prevent relative rotation and axial movement of brake disk 122 relative to outer sleeve 202. Roller clutch 124 may also include an inner sleeve 206 similarly fixedly coupled to drive shaft 116 to prevent relative rotation and axial movement of drive shaft 116 relative to inner sleeve 206. A plurality of rollers may be disposed between inner and outer sleeves 206, 202 to prevent relative rotation therebetween in a first direction and allow relative rotation therebetween in a second direction, as described above regarding one-way roller clutch 24. Although a roller clutch is shown, other clutch mechanisms may be used.

Operation

Operation of brake system 110 may be generally similar to the operation of brake system 10 described above, including the first, second, and third scenarios.

In the first scenario, when a drive torque is required to retract the rope or cable, motor 112 may be actuated to drive output shaft 134 in direction B' (shown in FIG. 8). Output shaft 134 may drive first cam member 130 in direction B', resulting in surface 172 of second cam member 132 riding along ramped surface 148 of first cam member 130 until circumferential end 174 of second cam member 132 abuts stop member 152 of first cam member 130. Once circumferential end 174 abuts stop member 152, it may be driven by cam member 130 in direction B'. When in this position, second cam member 132 is at a lowermost position along ramped surface 148. In this position, driveshaft 116 is in a leftmost axial position (with respect to FIG. 9) due to the force exerted by biasing member 128. When drive shaft 116 is in this leftmost position, brake disk 122 may remain engaged with stationary plate 120, preventing relative rotation therebetween. However, when motor 112 drives drive shaft 116 in direction B', roller clutch 124 is in a free spinning mode such that inner sleeve 206 rotates freely relative to outer sleeve 202 and thus isolates drive shaft 116 from the engaged condition of brake disk 122 and stationary plate 120. Therefore, motor 112 may drive shaft 116 and sun gear 118 without having to overcome the friction of brake disk 122 and stationary plate 120.

In the second scenario, when a drive torque in an opposite direction is used to extend the rope, motor 112 may be actuated to drive output shaft 134 in direction C' (shown in FIG. 8). Output shaft 134 may drive first cam member 130 in direction C', resulting in surface 172 of second cam member 132 riding along ramped surface 148 of first cam member 130 until notch 170 of second cam member 132 abuts stop member 152 of first cam member 130. Once notch 170 abuts stop member 152, it may be driven by cam member 130 in direction C'. When in this position, second cam member 132 is at an uppermost position along ramped surface 148. In this position, driveshaft 116 is in a rightmost position (with respect to FIG. 9) due to first cam member 130 urging second cam member 132 in a direction against the biasing force of biasing member 128. When drive shaft 116 is in this rightmost position, brake disk 122 may be disengaged from stationary plate 120, allowing relative rotation therebetween. When motor 112 drives drive shaft 116 in direction C', roller clutch 124 is in a locked mode and rotates brake disk 122 as drive shaft 116 rotates. However, brake disk 122 may rotate freely without applying any braking force since brake disk 122 is disengaged from stationary plate 120.

In the third scenario, when a driven torque is prevented from extending the rope, motor 112 may be idle and, therefore, not outputting a driving force to output shaft 134. This driven torque, which is applied in direction C', may be in the form of an external force exerted upon the rope during a "holding" maneuver. As a result of the force exerted by biasing member 128 against drive shaft 116, second cam member 132 may be forced along ramped surface 148 to the lowermost position, allowing brake disk 122 to remain engaged with stationary member 120.

The disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A power device comprising:
   a motor outputting a driving torque in a first and a second rotary direction;
   a drive shaft; and
   a cam mechanism including first and second cam members, said first cam member in driven engagement with said motor and including a circumferentially disposed ramped surface increasing in axial extent along the circumferential extent thereof, said ramped surface having a stop member at a first end thereof, said second cam member axially and rotatably fixed with said drive shaft and rotationally driven by said first cam member in the first and second rotary directions, said second cam member including an axially extending protrusion disposed about a circumference thereof, said protrusion slidably engaged with said ramped surface, rotation of said first cam member in the first rotary direction axially translating said drive shaft in a first axial direction and rotating said drive shaft in the first rotary direction and rotation of said first cam member in the second rotary direction translating said drive shaft in a second axial direction opposite the first axial direction and rotating said drive shaft in the second rotary direction;
   wherein said second cam member includes a recess receiving said drive shaft therein, said recess including a flat thereon, said drive shaft including a flat thereon generally abutting said flat on said recess.

2. A power device comprising:
   a motor outputting a driving torque in a first and a second rotary direction;
   a drive shaft; and
   a cam mechanism including first and second cam members, said first cam member in driven engagement with said motor and including a circumferentially disposed ramped surface increasing in axial extent along the circumferential extent thereof, said ramped surface having a stop member at a first end thereof, said second cam member axially and rotatably fixed with said drive shaft and rotationally driven by said first cam member in the first and second rotary directions, said second cam member including an axially extending protrusion disposed about a circumference thereof, said protrusion slidably engaged with said ramped surface, rotation of said first cam member in the first rotary direction axially translating said drive shaft in a first axial direction and rotating said drive shaft in the first rotary direction and rotation of said first cam member in the second rotary direction translating said drive shaft in a second axial direction opposite the first axial direction and rotating said drive shaft in the second rotary direction;
   a one-way clutch and a brake member, said one way clutch disposed between said drive shaft and said brake member, said one-way clutch being operable in a free spinning mode when said first cam member is driven in the first rotary direction to permit relative rotation between said drive shaft and said brake member and in a locked mode when said first cam member is driven in the second rotary direction to prevent relative rotation between said drive shaft and said brake member; and
   a stationary member fixed against rotation, said brake member engaging said stationary member when said first cam member is rotated in the first direction and disengaging said stationary member when said first cam member is rotated in the second direction.

3. The power device of claim 2, further comprising a biasing member providing a force biasing said second cam member in the first axial direction, thereby biasing said brake member into engagement with said stationary member.

4. A power device comprising:
   a motor outputting a driving torque in a first and a second rotary direction;
   a drive shaft; and
   a cam mechanism including first and second cam members, said first cam member in driven engagement with said motor and including a circumferentially disposed ramped surface increasing in axial extent along the circumferential extent thereof, said ramped surface having a stop member at a first end thereof, said second cam member axially and rotatably fixed with said drive shaft and rotationally driven by said first cam member in the first and second rotary directions, said second cam member including an axially extending protrusion disposed about a circumference thereof, said protrusion slidably engaged with said ramped surface, rotation of said first cam member in the first rotary direction axially translating said drive shaft in a first axial direction and rotating said drive shaft in the first rotary direction and rotation of said first cam member in the second rotary direction translating said drive shaft in a second axial direction opposite the first axial direction and rotating said drive shaft in the second rotary direction;
   wherein said ramped surface includes a second stop member at a second end thereof, said first and second stop members defining a first ramp portion and a second ramp portion.

5. The power device of claim 4, wherein said second cam member includes first and second axially extending protrusions disposed about a circumference thereof, said first protrusion slidably engaged with said first ramp portion and said second protrusion slidably engaged with said second ramp portion.

6. A brake mechanism for use in a power device, said brake mechanism comprising:
   a motor outputting a driving torque in a first and a second rotary direction;
   a cam mechanism including first and second cam members, said first cam member coupled with an output of said motor for rotation therewith and including an axial end surface having a guide member extending axially therefrom and a ramped surface extending circumferentially around said guide member, said second cam member slidably engaged with said ramped surface;
   a drive member operably coupled with said second cam member for rotation therewith;
   a stationary member fixed against rotation;
   a brake disk for selectively engaging said stationary member to produce a frictional braking force; and
   a one-way clutch operably coupled between said drive member and said brake disk, said one-way clutch being operable in a free spinning mode to permit relative rotation between said drive member and said brake disk and in a locked mode to prevent relative rotation between said drive member and said brake disk.

7. The brake mechanism of claim 6, wherein said second cam member includes an axially extending protrusion disposed about a circumference thereof, said protrusion slidably engaged with said ramped surface.

8. The brake mechanism of claim 6, wherein said ramped surface includes a stop member at an end thereof, said stop member engageable with said second cam member for co-rotation therebetween.

9. The brake mechanism of claim 6, wherein said ramped surface forms a radially outermost portion of said axial end surface.

10. The brake mechanism of claim 6, wherein said second cam member includes a recess in an end thereof, said recess including at least one flat thereon, said drive member disposed within said recess and including at least one flat abutting said flat on said recess.

11. The brake mechanism according to claim 6, wherein said first and second cam members cooperate to produce an axial movement of said drive member when said motor outputs said driving torque in one of the first and second rotary directions.

12. The brake mechanism according to claim 11 wherein said axial movement of said drive member causes said brake disk to reduce friction with said stationary member.

13. The brake mechanism according to claim 6, further comprising a spring member biasing said brake disk into engagement with said stationary member.

14. The brake mechanism according to claim 13, further comprising a thrust washer being disposed between said spring member and said brake disk.

15. The brake mechanism according to claim 14, further comprising a bearing device between said thrust washer and said brake disk.

* * * * *